United States Patent [19]

Van de Bult

[11] 4,391,035

[45] Jul. 5, 1983

[54] METHOD OF MOUNTING A MAGNETIC HEAD UNIT ON A MOVABLE CARRIER

[75] Inventor: Oelke Van de Bult, The Hague, Netherlands

[73] Assignee: U.S. Philips Corporation, New York, N.Y.

[21] Appl. No.: 305,313

[22] Filed: Sep. 24, 1981

[30] Foreign Application Priority Data

Apr. 14, 1981 [NL] Netherlands .......................... 8101824

[51] Int. Cl.³ .............................................. G11B 5/42
[52] U.S. Cl. ...................................... 29/603; 29/467; 360/103; 360/105
[58] Field of Search ................... 29/603, 467; 360/103, 360/105, 104, 106

[56] References Cited

U.S. PATENT DOCUMENTS 4,343,025 8/1982 Kronfeld et al. ................ 360/105 X
4,363,045 12/1982 Herman .......................... 360/105 X

*Primary Examiner*—Carl E. Hall
*Attorney, Agent, or Firm*—Joseph P. Abate

[57] ABSTRACT

A method of fixing a magnetic head unit on a carrying arm of a movable carrying arm arrangement for a magnetic disc storage device. The arm is arranged to be movable on a mounting aid by means of its own bearing, a previously manufactured fixing part for the magnetic head unit being also arranged on said aid in a well defined position leaving a space between the carrying arm and the fixing part. The space is filled with a suitable bonding agent, such as an adhesive, which, after curing, connects the fixing parts to the carrying arm in the correct position (FIG. 5).

4 Claims, 6 Drawing Figures

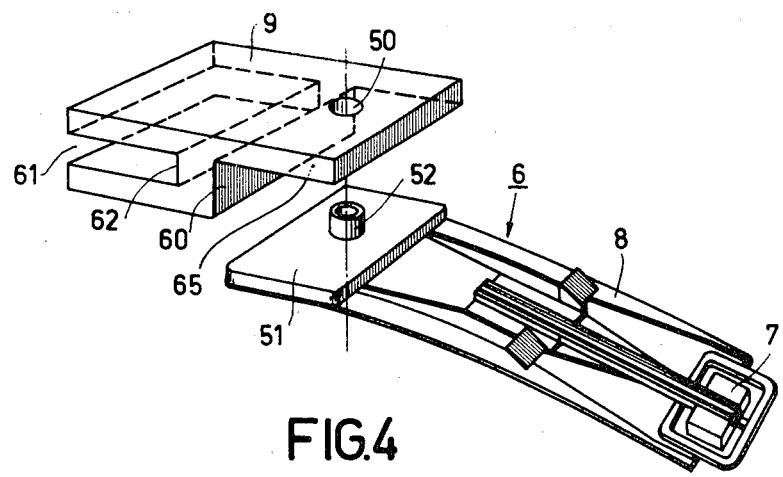
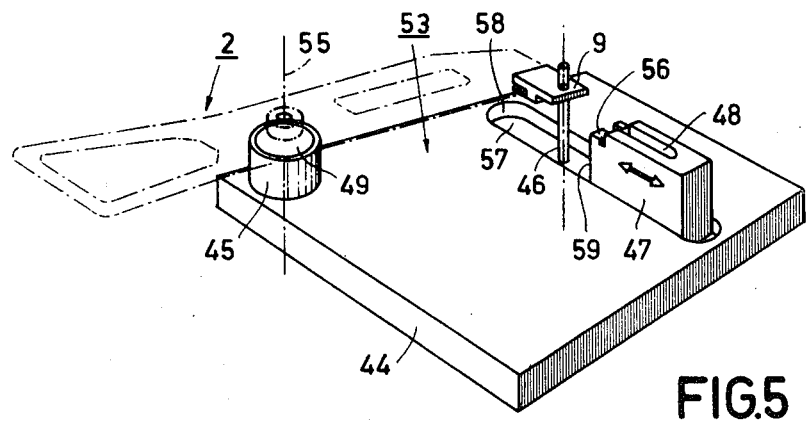
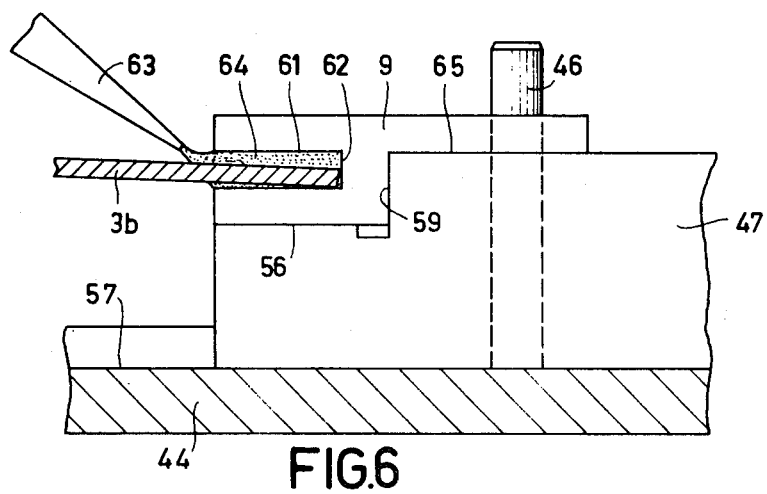

METHOD OF MOUNTING A MAGNETIC HEAD UNIT ON A MOVABLE CARRIER

BACKGROUND OF THE INVENTION

The invention relates to a method of mounting a magnetic head unit on a carrying arm of a movable carrier of a magnetic disk storage device for the storage and reproduction of data in digital form. The device comprises at least one rotating rigid magnetic disk, having a surface over which the magnetic head unit is moved for the storage and/or reproduction of the data in closely spaced tracks, a bearing arrangement which comprises bearing parts which are respectively connected to the movable carrier and to a stationary frame of the magnetic disk storage device, for accurately guiding the movements of the carrier relative to the frame and thereby guiding the movements of the magnetic head unit over said surface of said magnetic disk in an accurately defined plane.

Magnetic disk storage devices comprising one, two or a plurality of rigid magnetic disks, each magnetic disk serving for the storage and reproduction of data in digital form on at least one side and generally on both sides, are used on a large scale as peripheral equipment for data processing devices such as computers. The magnetic disks rotate with high speed. The magnetic heads, which are secured to the ends of the carriers, are moved over the magnetic disk surfaces to locations which are predetermined by the data processing device for thus storing data in a specific track on the magnetic disk or reproducing data from said track. The magnetic heads should be moved as rapidly as possible over the magnetic disks in order to minimize the time required for locating the correct track and storing or reproducing the data. The magnetic disks are manufactured with an extremely high degree of flatness. The magnetic heads float on a very thin film of air just above the magnetic disks. Each magnetic head is secured to a resilient magnetic head frame in order to obtain the mobility which permits the magnetic head to float on the air film and to provide a resilient load which exerts an accurately defined pressure on said head. In order to minimize the external dimensions of magnetic disk storage devices, the various manufacturers attempt to arrange the magnetic disks as closely as possible to each other. The carriers, especially when they are moved between two magnetic disks, should therefore be as flat as possible and move as close as possible to the magnetic disc surface. It is obvious that the carrying arm should never touch the magnetic disk surface because this would render the magnetic disk absolutely unserviceable. From the foregoing, it follows that movable carriers for magnetic disc storage devices should be manufactured with the necessary precision.

SUMMARY OF THE INVENTION

It is the object of the present invention to provide a method by means of which a movable carrier for a magnetic disk storage device can be obtained which, especially as regards the position of the magnetic head unit relative to the plane of movement of the movable carrier can be manufactured within the required tolerances. However, the inventive method has the advantage that less stringent requirements are imposed on the precision with which the remainder of the movable carrier is manufactured. Thus, said carrier can be manufactured with simpler means and more cheaply.

The method in accordance with the invention is characterized in that the method comprises the following steps in the specified order:
  a. manufacturing a fixing part for the magnetic head unit the part being, provided with locating faces, recesses, projections and openings for subsequent positioning and fixing of a magnetic head unit,
  b. arranging the carrying arm and the fixing part on a mounting aid provided with first positioning means for positioning the carrying arm relative to the mounting aid and second positioning means for positioning the fixing part relative to the mounting aid, the carrying arm and the fixing part assuming a relative position on the mounting aid which is within the required positional tolerances of the finished product but leaving a certain space between the fixing part and the carrying arm,
  c. filling the space, at least partly, with a bonding agent in liquid form, such as an adhesive or solder,
  d. allowing the bonding agent to cure, and
  e. securing the magnetic head unit to the fixing part.

The invention is based on the recognition that the position of the part of the movable carrier on which the magnetic head unit is mounted is of special importance. Therefore, the accuracy of a movable carrier manufactured in accordance with the inventive method does not depend as much on the accuracy in said part of the movable carrier as on the accuracy with which the fixing part is manufactured and the accuracy of the mounting aid. The fixing parts can readily be mass manufactured with the required accuracy and each mounting aid may be employed for the manufacture of a large number of products. Specifically, less stringent requirements are imposed on the accuracy of the shape and dimensions of the carrying arms which are the largest components of the carriers.

An embodiment of the method in accordance with the invention which presents advantages with respect to a satisfactory connection between the fixing part and the carrying arm is characterized in that the fixing part is formed with a slot in which the carrying arm engages with clearance and that the space left between the carrying arm and the slot walls is filled with a bonding agent in liquid form.

The influence of dimensional tolerances of the bearing arrangement on the accuracy of the finished product is reduced when an embodiment of the invention is used which is characterized in that the mounting aid is provided with first positioning means for positioning the bearing parts connected to the carrying arm relative to the mounting aid and that the carrying arm is provided with said bearing parts before it is placed on the mounting aid. The first positioning means may resemble the bearing parts connected to the stationary frame of the magnetic disk storage device so that the carrying arm is arranged on the aid in substantially the same way as in the magnetic disk storage device.

In many cases, magnetic head units are used which are supplied as complete units by specialized companies. A method in accordance with the invention which is adapted for mounting magnetic head units of a known type that is units provided with a fixing bush which engages in an opening with clearance, after which, for securing the magnetic head unit a ball with a specific oversize is forced through the fixing bush so that the clearance between the fixing bush and the wall of the opening is eliminated—is characterized in that the fixing part is formed with a through-hole for the fixing bush and that the second positioning means comprises a locating pin which is inserted into said through-hole with clearance as well as a stop, which limits the movement of the fixing part on the locating pin in the axial direction.

BRIEF DESCRIPTION OF THE DRAWINGS

An embodiment of the invention will now be described in more detail with reference to the accompanying drawing, in which:

FIG. 4 is a perspective view, to an enlarged scale, of a fixing device for a carrier, as shown in FIGS. 1 and 2; a known magnetic head unit, and FIG. 5 is a perspective view of a mounting aid with a fixing component arranged thereon, the outline of a mounted carrying arm being represented by broken lines; and FIG. 6 is a side view of the mounting aid in use.

DESCRIPTION OF THE PREFERRED EMBODIMENT

Figure 1:
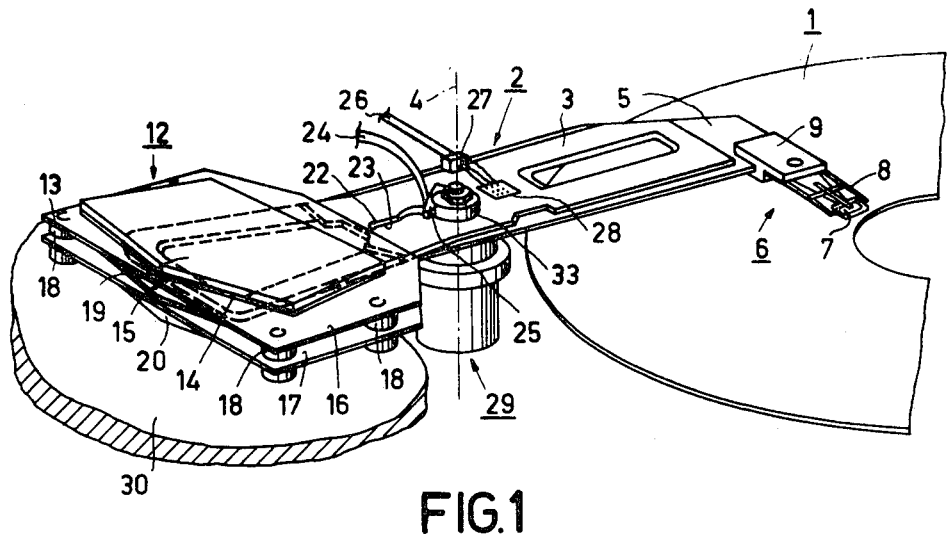
FIG. 1 is a perspective view of a single pivotal carrier with a rotary carrying arm and a magnetic head unit.

FIG. 1 shows a part of a magnetic disk store for use in peripheral computer equipment. It comprises a rigid memory disk 1—shown only partly—and an electrically controllable carrier 2. Said carrier comprises an aluminium carrying arm 3, see also FIG. 2, in the form of a two-armed lever which is pivotable about a pivotal axis 4 between the two ends 5,10. Near the end 5, a magnetic head unit 6 is located. This unit comprises a magnetic head 7 and a resilient magnetic head support 8 which is rigidly connected to the carrying arm 3. When stationary the magnetic head bears on the surface of the magneic disk 1 which, in known manner, is provided with a smooth magnetizable surface layer. When the storage disk is rotated at its operating speed, the magnetic head 7 floats on a thin air film which is formed by the boundary layer at the location where the air is perturbed by the magnetic head. The lift, which the magnetic head 7 then experiences relative to the surface of the storage disk, causes the resilient magnetic head support 8 to bend slightly, thereby providing a force of the required magnitude which urges the magnetic head onto the air film. The magnetic head unit is arranged on a fixing part 9 which is rigidly connected to the arm 3 using the method in accordance with the invention to be described hereinafter.

On the other end 10 of the carrying arm 3, a drive coil 11 is mounted. Such coil belongs to electromagnetic, electrically controllable drive means 12 by means of which the carrying arm 3 can be made to pivot about the pivotal axis 4 so as to enable the magnetic head 7 to be moved over the storage disk 1 in a substantially radial direction. In addition to the drive coil 11, said drive means comprises a stator 13. Said stator comprises two permanent magnets 14,15 which are glued in two aluminium supporting plates 16,17.

Figure 2:
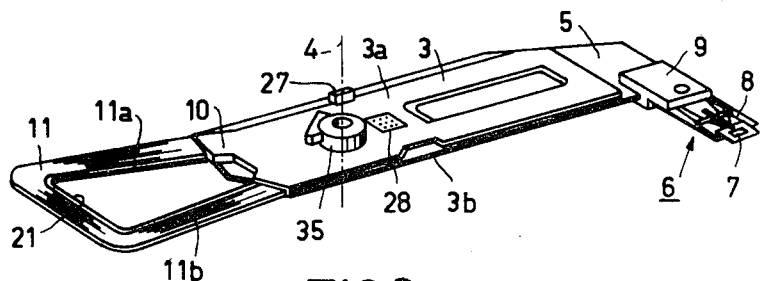
FIG. 2 is a perspective view of the carrier used in FIG. 1.

As can be seen in FIG. 2, the turns of the drive coil 11 are situated in a plane which is substantially perpendicular to the pivotal axis 4 and the drive coil has a substantially planar overall shape with a thickness which is smaller than its other dimensions. The magnets 14,15 of the stator 13 are flat permanent magnets magnetized in the direction of the pivotal axis 4. These magnets are arranged on both sides of the drive coil 11 by means of eight spacers 18 at such an axial distance that, between the drive coil and each permanent magnet, a small air gap is formed. The magnetization of the magnets 14,15 is such that the limbs 11a,11b of the coil 11 are located in magnetic fields of opposite polarity. On the side of each permanent magnet which is remote from the drive coil 11 flat soft-iron closing plates 19,20 are arranged. These plates close the magnetic circuit of the stator 13 on the axial sides. See also FIG. 3.

The drive coil 11 and the carrying arm 3 are disposed substantially in the same plane perpendicular to the pivotal axis 4. The carrying arm 3 comprises two parts 3a,3b manufactured from an aluminium sheet. The two parts are rigidly connected to each other, for example, by glueing. The drive coil 11 constitutes a rigid unit. The turns of the coil are wound onto a plastics coil former 21 and are united with the coil former and each other by means of a synthetic resin to form a single structural unit. Near the second end 10 of the carrying arm 3 said unit is fixed between the two parts 3a,3b, by both clamping and glueing.

The control voltage for controlling the position of the carrying arm 3 relative to the storage disk 1, (and thus the position of the magnetic head 7 relative to the storage disc) is applied via two coil leads 22,23. A leaf spring 24, partly visible in FIG. 1, cooperates with its free end with a projection 25 on the carrying arm 3 near the pivotal axis 4. The other end (not shown) of the leaf spring 24 is rigidly connected to the stationary parts of the disk store so that the leaf spring constantly exerts a pressure on the projection 25. Said pressure results in a torque about the pivotal axis 4. This torque continuously tends to pivot the carrying arm into its initial position which is that position in which the magnetic head 7 is located at the largest radius on the magnetic storage disk 1. The leaf spring 24 also serves for supporting the coil leads 22,23 and, thus, for connecting the drive coil 11 to an electronic control circuit for controlling the carrier.

A number of wires for transferring signals to and from the magnetic head are united to a flexible lead 26. A free end of the lead is rigidly connected to the carrying arm 3 at the location of a terminal block 27. The individual wires, of which only three wires are visible in FIG. 1, are connected to a connecting strip 28 glued onto the supporting arm 3. The connections between the connecting strip 28 and the magnetic head are not shown for the sake of simplicity.

Figure 3:
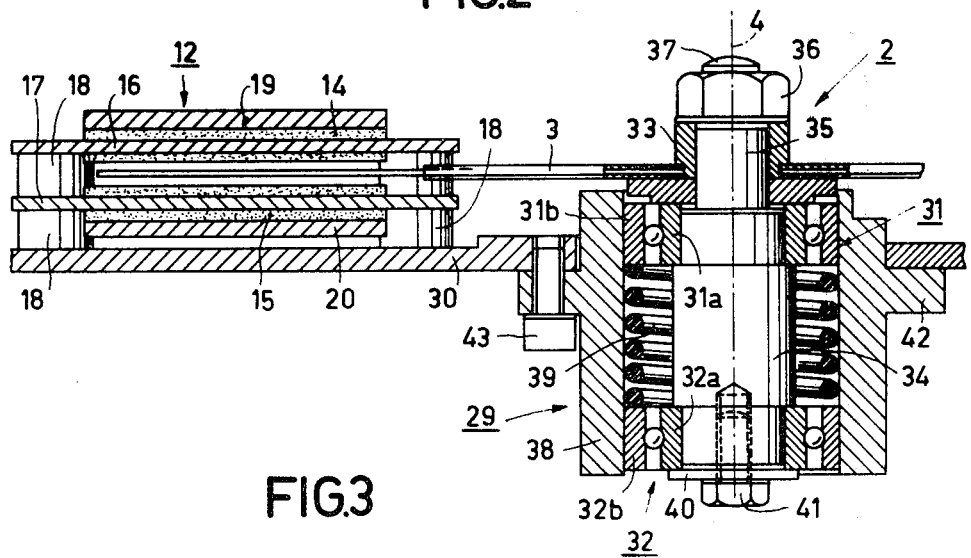
FIG. 3 is a cross-sectional view of the bearing arrangement and a stator of the carrier shown in FIG. 1.

FIG. 3 is a sectional view of the bearing arrangement 29 in accordance with FIG. 1. The carrying arm 3 is provided with a hub 33. Said hub is connected to the carrying arm 3 by pressing in and, as the case may be, by glueing. A central spindle 34 comprises a reduced portion 35 on which the carrying arm is mounted by means of a nut 36 fitted onto a threaded portion 37 on the end of the reduced portion 35. The spindle 34 is journalled in two ball-bearings 31,32 with inner races 31a, 32a and outer races 31b, 32b. The bearings are mounted in a bearing housing 38. The ball bearing 31 is rigidly connected to the inner side of the bearing housing 38 by means of a suitable adhesive. The ball bearing 32 is urged towards one of the free ends of the spindle 34 by means of a helical pressure spring 39 and is clamped onto the spindle 34 by means of a retaining plate 40 and a bolt 41 which is fitted into the spindle 34. The bearing housing 38 comprises a flange 42 for securing the bearing housing to the underside of a frame plate 30 of a magnetic disk store. Securing is accomplished, for example, by means of bolts 43.

The mounting aid shown in FIG. 5 mainly comprises a rigid base plate 44 to which a bush 45 and a locating pin 46 are secured. Furthermore, there is provided a sliding block 47 with a slot 48 in which the locating pin 46 engages. The sliding block 47 is movable over an upper surface of the base plate 44. The outer races 31b,32b of the ball bearings 31,32 are a sliding fit in a bore 49 of the bush 45. The fixing block 9, see in particular FIG. 4, is formed with a through-hole 50. The magnetic head unit 6 is of a known and commercially available type and comprises a magnetic head 7, a resilient magnetic head support 8 and a fixing plate 51 with a fixing bush 52. The resilient magnetic head support 8 has a slightly curved shape. When the carrier is assembled, the magnetic head 7 is slightly lifted against the resilient force of the magnetic head support 8 and placed onto the magnetic disk 1. This provides the required pressure for the magnetic head 7. Such pressure is of the order of magnitude of 10 grammes. The magnetic-head unit 6 can be secured to the fixing part 9 by forcing an oversize ball through the fixing bush 52 so that the clearance between the fixing bush and the wall of the opening 50 is eliminated.

The method in accordance with the invention for mounting the magnetic head unit 6 on the carrying arm 3 is as follows.

The fixing part 9 is manufactured previously and is formed with a locating face 65 and with a through bore 50. The carrying arm 3, together with the ball bearings 31,32, which are mounted onto it by means of the spindle 34 and the bolt 41, is placed onto the mounting aid 53 in accordance with FIG. 5. Said mounting aid is provided with first positioning means in the form of a bush 45 for positioning the outer races 31b,32b of the bearings 31,32 which are connected to the carrier 3 and which have a sliding fit in the bush 45. The bush 45 has an annular stop, not shown in FIG. 5, for the outer race 32b of the ball bearing 32. After mounting in the bush 45, the axis 4 of the supporting arm 3 coincides with a central axis 55 of the opening 49 in the bush 45. Said stop ensures that the carrying arm is located at a specific level above the base plate 44 of the mounting aid. Thus, the carrying arm 3 can be pivoted over the base plate 44 about the axis 55 at an accurately defined level.

The mounting aid 53 comprises second positioning means in the form of the locating pin 46 and the sliding block 47, for positioning the fixing part 9 relative to the base plate 44. The locating pin 46 is a sliding fit in the through-hole 50 in the fixing part 9. A machined surface 56 of the sliding block 47 cooperates with the locating face 65 of the fixing part 9 and serves as a stop which limits the movement of the fixing part 9 on the locating pin 46 in the axial direction. The sliding block 47 can slide over a bottom 57 of a slot 58 in the base plate 44 and cooperates with its front 59 with a positioning surface 60 of the fixing component 9, see also FIG. 6.

The fixing part 9 is formed with a slot 61 in which the carrying arm 3 engages with clearance. After the fixing part 9 has been positioned with the aid of the locating pin 46 and the sliding block 47, the carrying arm 3, which has been placed on the mounting aid, is pivoted about the axis 55 by means of its bearing arrangement until a rear wall 62 of the slot 61 is reached. The ball bearings 31,32 and the fixing part 9 occupy a relative position on the mounting aid 53 which is within the required positional tolerances of the finished product. Between the fixing part 9 and the carrier 3, a certain clearance exists; see in particular FIG. 6. In this figure the part 3b of the carrying arm 3 is shown with an exaggerated inclination and an exaggerated clearance in the slot 61 of the fixing part 9. The space between the portion 3b of the supporting arm 3 and the two walls of the slot 61 of the fixing part 9 is filled with a suitable bonding agent 64, for example, a suitable two-component adhesive, by means of a suitable tool 63. Owing to the presence of the slot 61, layers of bonding agent 64 are formed on both sides of the part 3b of the carrying arm 3 so that an excellent adhesion of the fixing part 9 to the carrying arm 3 can be obtained. After a curing of the bonding agent, the carrying arm with the fixing part 9 mounted on it is removed from the mounting aid 53. Then the magnetic head unit 6 may be secured to the locating face 65 of the fixing part 9 in the manner previously described.

Although the foregoing method in accordance with the invention has been described for use in a pivotal bearing arrangement for a magnetic disk store, the invention may also be employed advantageously in carrier devices having a carrying arm which does not perform a pivotal but rather a translational movement. In such a case, different first positioning means will be used, which may, for example, be adapted to the bearing means employed and which, like the bush 45 in the example described, may resemble the parts of the bearing arrangement present in the magnetic disk store and connected to the stationary frame. For each carrying arm, a plurality of fixing parts may be provided for a plurality of magnetic head units.

What is claimed is:

1. A method of mounting a magnetic head unit (6) on a carrying arm (3) of a movable carrier (2) of a magnetic disk storage device for digital data, which device comprises at least one rotating rigid magnetic disk (1) having a surface over which the magnetic head unit is moved for the storage and/or reproduction of the data in closely spaced tracks, and a bearing arrangement (29) which comprises bearing parts (31a, b; 32a, b) respectively connected to the movable carrier (2) and to a stationary frame (30) of the magnetic disk storage device, for accurately guiding the movements of the carrier (2) relative to the frame (30) and thereby guiding the movements of the magnetic head unit (6) over said surface of said magnetic disk (1) in an accurately defined plane, characterized in that the method comprises the following steps in the specified order:

a. manufacturing a fixing part (9) for the magnetic head unit (6), the part being provided with locating faces, recesses, projections and openings for subsequent positioning and fixing of the magnetic head unit;

b. arranging said carrying arm (3) and the fixing part (9) on a mounting aid (53) provided with first means (45) for positioning the carrying arm (3) relative to the mounting aid and second means (46, 47) for positioning the fixing part (9) relative to the mounting aid, the carrying arm 3 and the fixing part (9) assuming a relative position on the mounting aid (53) which is within the required positional tolerances of the finished product, but leaving a certain space between the fixing part (9) and the carrying arm (3);

c. filling said space, at least partly, with a bonding agent in liquid form, such as an adhesive or solder;

d. allowing the bonding agent to cure; thereby securing said fixing part and said carrying arm in said relative position determined in step b, and e. securing the magnetic head unit to the fixing part.

2. A method as claimed in claim 1, characterized in that the fixing part (9) is formed with a slot (61) in which the carrying arm (3) engages with clearance, and that the space left between the carrying arm and the slot walls is filled with a bonding agent in liquid form.

3. A method as claimed in claim 1, characterized in that the mounting aid (53) is provided with first means (45) for positioning the bearing parts (31, 32) connected to the carrying arm (3) relative to the mounting aid, and that the carrying arm is provided with said bearing parts (31, 32) before it is placed on the mounting aid.

4. A method as claimed in claim 1, adapted for mounting magnetic head units (6) provided with a fixing bush (52) which engages in an opening (50) with clearance, after which, for securing of the magnetic head unit, a ball with a specific oversize is forced through the fixing bush so that the clearance between the fixing bush and the wall of the opening is eliminated, characterized in that the fixing part (9) is formed with a through-hole (50) for the fixing bush (52), and that the second positioning means a locating pin (46) which is inserted into the said hole (50) with clearance, and a stop (47), which limits the movement of the fixing part (9) on the locating pin (46) in the axial direction.

* * * * *